(12) United States Patent
Zhang et al.

(10) Patent No.: US 10,214,174 B2
(45) Date of Patent: Feb. 26, 2019

(54) VEHICLE AIRBAG APPARATUS

(71) Applicant: TOYODA GOSEI CO., LTD., Kiyosu-shi, Aichi-ken (JP)

(72) Inventors: Ning Zhang, Beverly Hills, MI (US); Lan Gu, Northville, MI (US); Eugene Lee, Troy, MI (US)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 82 days.

(21) Appl. No.: 15/418,921

(22) Filed: Jan. 30, 2017

(65) Prior Publication Data

US 2018/0215340 A1 Aug. 2, 2018

(51) Int. Cl.
| | |
|---|---|
| *B60R 21/00* | (2006.01) |
| *B60R 21/203* | (2006.01) |
| *B60R 21/205* | (2011.01) |
| *B60R 21/233* | (2006.01) |
| *B60R 21/2338* | (2011.01) |
| *B60R 21/2342* | (2011.01) |

(52) U.S. Cl.
CPC ........ *B60R 21/2338* (2013.01); *B60R 21/203* (2013.01); *B60R 21/205* (2013.01); *B60R 21/233* (2013.01); *B60R 21/2342* (2013.01); *B60R 2021/0009* (2013.01); *B60R 2021/23316* (2013.01); *B60R 2021/23382* (2013.01); *B60R 2021/23386* (2013.01)

(58) Field of Classification Search
CPC . B60R 21/2338; B60R 21/233; B60R 21/203; B60R 21/205; B60R 21/2342; B60R 2021/0009; B60R 2021/23382; B60R 2021/23386; B60R 2021/23316; B60R 2021/23308; B60R 2021/161
See application file for complete search history.

(56) References Cited

U.S. PATENT DOCUMENTS

| | | | | |
|---|---|---|---|---|
| 5,609,363 | A * | 3/1997 | Finelli | B60R 21/231 280/730.1 |
| 5,762,367 | A * | 6/1998 | Wolanin | B60R 21/233 280/736 |
| 6,113,134 | A * | 9/2000 | Lim | B60R 21/217 180/282 |
| 6,736,426 | B2 * | 5/2004 | Winters | B60R 21/233 280/743.2 |

(Continued)

FOREIGN PATENT DOCUMENTS

| | | |
|---|---|---|
| JP | 2001-301555 A | 10/2001 |
| JP | 2005-096495 A | 4/2005 |

(Continued)

*Primary Examiner* — Laura Freedman
(74) *Attorney, Agent, or Firm* — Posz Law Group, PLC (57) ABSTRACT

An airbag apparatus includes an airbag, which is configured to be supplied with gas to be deployed and inflated in front of one of a driver's seat and a front passenger seat. The airbag includes an airbag body and a pocket portion provided on a side of the airbag body. The airbag apparatus includes an outer tether, an inflator, and an actuator. The outer tether is located outside the airbag and is joined to the pocket portion. The inflator supplies gas to the airbag. When a movement of the vehicle in an oblique direction due to a collision is detected, the actuator pulls the outer tether to extract the pocket portion.

6 Claims, 7 Drawing Sheets

(56) References Cited

U.S. PATENT DOCUMENTS

| | | | | |
|---|---|---|---|---|
| 7,040,650 B2* | 5/2006 | Neupert | | B60R 21/231 |
| | | | | 280/729 |
| 7,377,548 B2* | 5/2008 | Bauer | | B60R 21/231 |
| | | | | 280/743.2 |
| 7,497,469 B2* | 3/2009 | Fischer | | B60R 21/233 |
| | | | | 280/743.2 |
| 7,850,203 B2* | 12/2010 | Niwa | | B60R 21/233 |
| | | | | 280/743.2 |
| 7,992,897 B2* | 8/2011 | Sekino | | B60R 21/231 |
| | | | | 280/729 |
| 8,596,680 B2 | 12/2013 | Kim et al. | | |
| 8,636,301 B1* | 1/2014 | Wang | | B60R 21/232 |
| | | | | 280/730.2 |
| 8,899,617 B2* | 12/2014 | Fukawatase | | B60R 21/232 |
| | | | | 280/730.2 |
| 9,187,055 B1* | 11/2015 | Genthikatti | | B60R 21/2338 |
| 9,187,058 B2* | 11/2015 | Yamaji | | B60R 21/205 |
| 9,199,600 B2* | 12/2015 | Kawamura | | B60R 21/232 |
| 9,205,798 B1 | 12/2015 | Jindal et al. | | |
| 9,358,945 B2* | 6/2016 | Yamada | | B60R 21/233 |
| 9,428,139 B2* | 8/2016 | Yamada | | B60R 21/233 |
| 9,499,118 B2* | 11/2016 | Jindal | | B60R 21/231 |
| 9,505,370 B2* | 11/2016 | Kim | | B60R 21/233 |
| 9,505,372 B2* | 11/2016 | Yamada | | B60R 21/2338 |
| 9,550,465 B1* | 1/2017 | El-Jawahri | | B60R 21/01512 |
| 9,580,040 B2* | 2/2017 | Komatsu | | B60R 21/233 |
| 9,650,011 B1* | 5/2017 | Belwafa | | B60R 21/233 |
| 9,676,355 B2* | 6/2017 | Kruse | | B60R 21/0136 |
| 9,738,243 B2* | 8/2017 | Fukawatase | | B60R 21/233 |
| 9,758,123 B2* | 9/2017 | Yamada | | B60R 21/235 |
| 9,796,354 B1* | 10/2017 | Hayashi | | B60R 21/239 |
| 9,956,937 B2* | 5/2018 | Jindal | | B60R 21/205 |
| 9,963,101 B2* | 5/2018 | El-Jawahri | | B60R 21/233 |
| 2005/0062270 A1 | 3/2005 | Kai | | |
| 2006/0131847 A1* | 6/2006 | Sato | | B60R 21/207 |
| | | | | 280/730.2 |
| 2006/0163848 A1* | 7/2006 | Abe | | B60R 21/231 |
| | | | | 280/729 |
| 2011/0309605 A1* | 12/2011 | Kumagai | | B60R 21/2338 |
| | | | | 280/741 |
| 2016/0009242 A1* | 1/2016 | Fukawatase | | B60R 21/2338 |
| | | | | 280/730.1 |
| 2016/0096503 A1* | 4/2016 | Lee | | B60R 21/231 |
| | | | | 280/743.2 |
| 2017/0129439 A1* | 5/2017 | Taguchi | | B60R 21/205 |
| 2017/0136981 A1* | 5/2017 | Fukawatase | | B60R 21/233 |
| 2017/0158154 A1* | 6/2017 | Kobayashi | | B60R 21/01332 |
| 2017/0217397 A1* | 8/2017 | Sumiya | | B60R 21/233 |
| 2017/0217399 A1* | 8/2017 | Patel | | B60R 21/013 |
| 2017/0291569 A1* | 10/2017 | Sugie | | B60R 21/233 |

FOREIGN PATENT DOCUMENTS

| | | |
|---|---|---|
| JP | 2008-044594 A | 2/2008 |
| JP | 2016153262 A * | 8/2016 |

* cited by examiner

VEHICLE AIRBAG APPARATUS

BACKGROUND OF THE INVENTION

The present invention relates to a vehicle airbag apparatus, which includes an airbag that is deployed and inflated in front of the driver's seat or the front passenger seat when supplied with gas.

Conventionally known apparatuses for protecting occupants in vehicle collisions include a driver's seat airbag apparatus, which deploys and inflates an airbag to cover the space above the steering wheel in front of the driver's seat, and a front passenger seat airbag apparatus, which deploys and inflates an airbag projecting from the instrument panel in front of the front passenger seat.

The description of U.S. Pat. No. 9,205,798 discloses an apparatus for protecting occupants in oblique collisions of vehicles. This apparatus includes a base portion and an airbag supported by the base portion. The airbag includes an airbag body and an extension, which is expanded beside the airbag body. The airbag incorporates a tether, which extends from the base portion to the extension. When an oblique collision of the vehicle is detected by a sensor, the tether is released to release the extension to be deployed and inflated. Thus, if the occupant slides along the impact surface of the airbag body at an oblique collision of the vehicle, the head of the occupant is received by the extension.

In the apparatus disclosed in U.S. Pat. No. 9,205,798, the extension is deployed and inflated solely by the pressure of gas supplied through the interior of the airbag body. Thus, the extension cannot be inflated at an early stage and may not be able to receive the occupant's head.

SUMMARY OF THE INVENTION

Accordingly, it is an objective of the present invention to provide a vehicle airbag apparatus that is capable of receiving the head of an occupant who is falling obliquely forward at an oblique collision of a vehicle.

To achieve the foregoing objective and in accordance with one aspect of the present invention, a vehicle airbag apparatus is provided that includes an airbag, an outer tether, an inflator, and an actuator. The airbag is configured to be supplied with gas to be deployed and inflated in front of one of a driver's seat and a front passenger seat. The airbag includes an airbag body and a pocket portion provided on a side of the airbag body. The outer tether is located outside the airbag and joined to the pocket portion. The inflator supplies gas to the airbag. When a movement of the vehicle in an oblique direction due to a collision is detected, the actuator pulls the outer tether to extract the pocket portion.

To achieve the foregoing objective and in accordance with another aspect of the present invention, a vehicle airbag apparatus is provided that includes an airbag, an inflator, and an inner tether. The airbag is configured to be supplied with gas to be deployed and inflated in front of one of a driver's seat and a front passenger seat. The airbag includes an airbag body and a pocket portion provided on one side of the airbag body. The inflator supplies gas to the airbag. The inner tether is provided inside the airbag and includes a first end joined to the pocket portion and a second end joined to the airbag body at a location that is on an opposite side of the airbag body from the one side.

DETAILED DESCRIPTION OF THE PREFERRED EMBODIMENTS

First Embodiment

Hereinafter, a vehicle airbag apparatus according to the present invention will be described with reference to FIGS. 1 to 4. In the first embodiment, the vehicle airbag apparatus is a driver's seat airbag apparatus 10.

Figure 1:
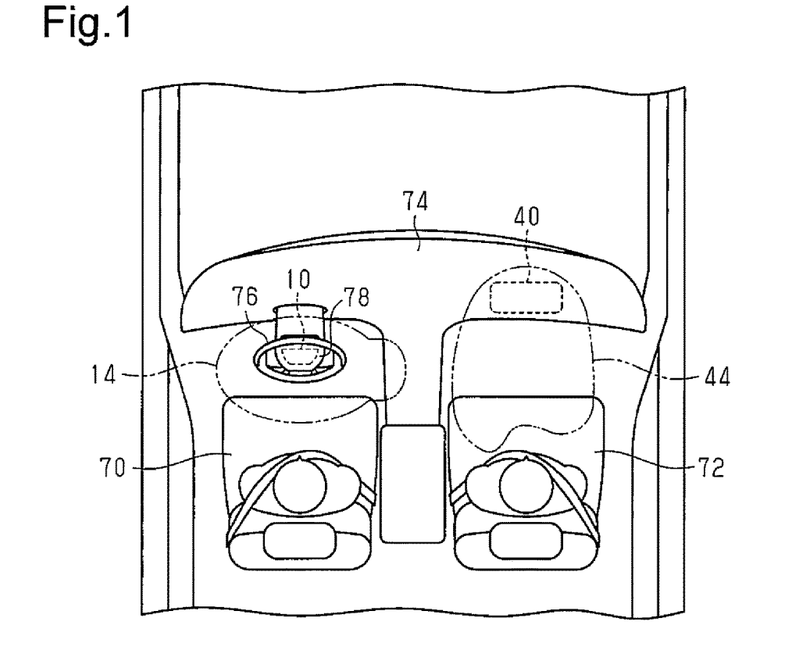
FIG. 1 is a plan view illustrating the front seats and the surroundings of an automobile according to a first embodiment.

As shown in FIG. 1, an automobile includes a driver's seat 70 and a front passenger seat 72 arranged in the vehicle width direction and are spaced apart from each other. In the automobile of the present embodiment, the driver's seat 70 is located on the left side when facing forward of the vehicle. Hereinafter, the front-rear direction of the vehicle will be simply referred to as a front-rear direction.

An instrument panel 74, which extends in the vehicle width direction, is provided in front of the driver's seat 70 and the front passenger seat 72.

A steering wheel 76 is provided in front of the driver's seat 70. The steering wheel 76 has a boss 78, which incorporates a driver's seat airbag apparatus 10. The airbag apparatus 10 includes an airbag 14, which is supplied with gas to be deployed and inflated in front of the driver's seat 70.

The instrument panel 74 stores a front passenger seat airbag apparatus 40 in a section in front of the front passenger seat 72. The airbag apparatus 40 includes an airbag 44, which is supplied with gas to be deployed and inflated in front of the front passenger seat 72.

Figure 2:
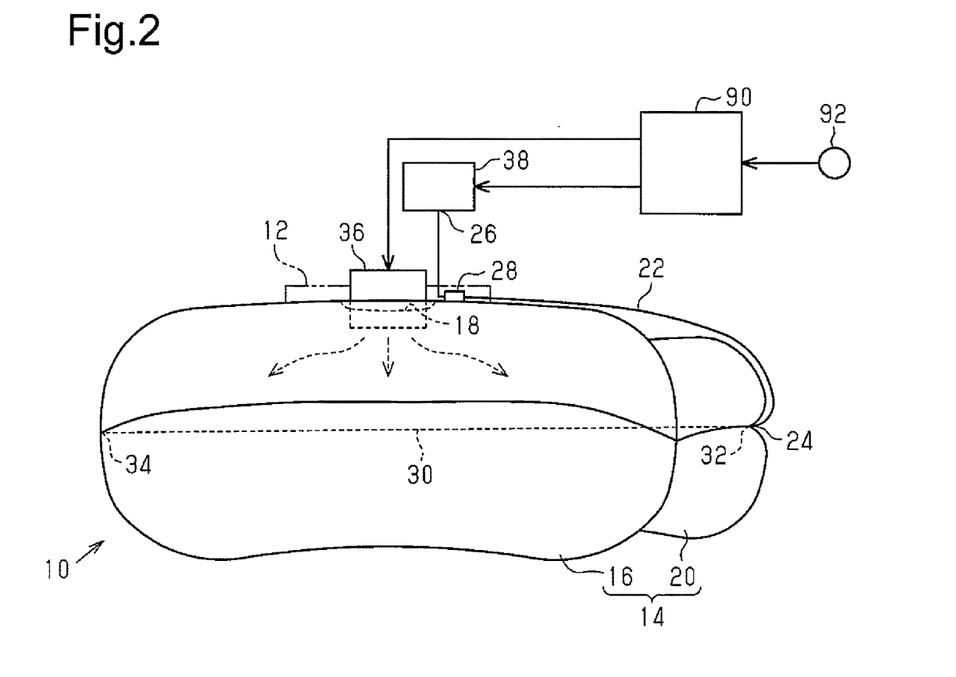
FIG. 2 is a diagram showing an airbag, which is completely deployed and inflated, with the electrical configuration of an airbag apparatus.

As shown in FIG. 2, the airbag 14 of the driver's seat airbag apparatus 10 has an airbag body 16 and a pocket portion 20. The airbag body 16 is supported by a base portion 12, which is provided in the boss 78. The pocket portion 20 is provided on a side of the airbag body 16. In the folded state of the airbag 14, the pocket portion 20 is hidden inside the airbag body 16. In the airbag 14 of the present embodiment, the pocket portion 20 is provided on the inner side of the opposite sides in the vehicle width direction of the airbag body 16. That is, the pocket portion 20 is provided on the side corresponding to the front passenger seat 72 and projects further inward in the vehicle width direction than the airbag body 16.

An inflator 36 for supplying gas to the airbag 14 is attached to the base portion 12. The inflator 36 is inserted into the airbag body 16 through an opening 18.

An outer tether 22 is provided outside the airbag 14. The outer tether 22 has a first end 24, which is joined to the distal end of the pocket portion 20 (the right end as viewed in FIG. 2), and a second end 26, which is joined to an actuator 38. The actuator 38 is located, for example, inside the boss 78. In the present embodiment, the actuator 38 is of an explosive type. When the airbag 14 is completely deployed and inflated, the outer tether 22 is located in front of the airbag body 16 and guided by an outer guide 28 on the outer surface of the airbag body 16 to extend toward the actuator 38.

An inner tether 30 is provided in the airbag 14. The inner tether 30 has a first end 32, which is joined to the first end 24 of the outer tether 22, and a second end 34, which is joined to the airbag body 16. The second end 34 of the inner tether 30 is joined to the outer side of the opposite sides in the vehicle width direction of the airbag body 16 (the left side as viewed in FIG. 2). That is, the second end 34 of the inner tether 30 is joined to the side of the airbag body 16 that is opposite to the side at which the pocket portion 20 is provided.

A controller 90 is connected to the inflator 36 and the actuator 38. A sensor 92 for detecting a collision of the vehicle is connected to the controller 90.

When detecting an oblique movement of the vehicle due to a collision (hereinafter, referred to as an oblique vehicle collision) based on a detection signal from the sensor 92, the controller 90 activates the inflator 36 to supply gas to the airbag 14 and activates the actuator 38 to pull the outer tether 22 to extract the pocket portion 20. In contrast, when detecting a head-on collision of the vehicle, the controller 90 activates the inflator 36, but does not activate the actuator 38.

Operation of the present embodiment will now be described.

Figure 3:
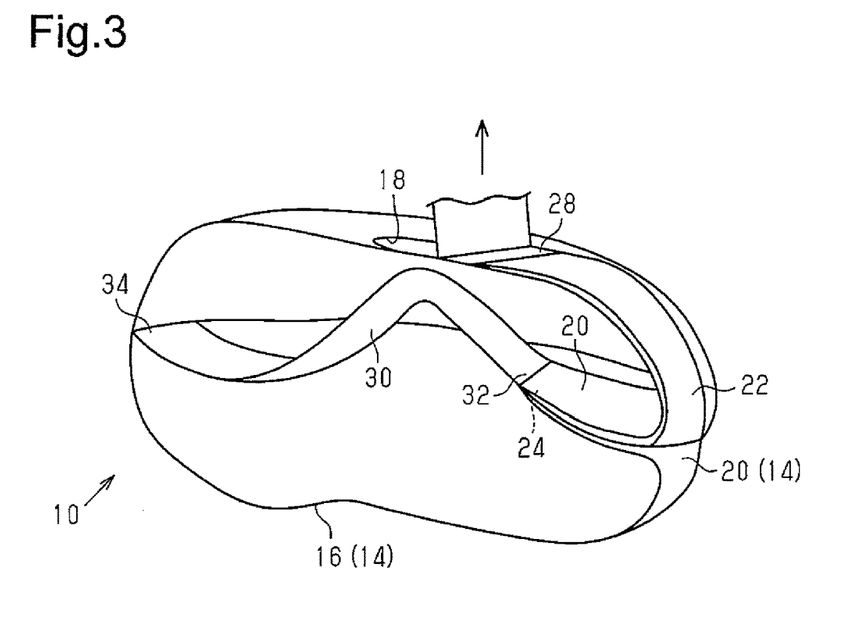
FIG. 3 is a cross-sectional view illustrating the airbag when being deployed and inflated.

When the controller 90 detects an oblique vehicle collision based on a detection signal from the sensor 92, the inflator 36 is activated to supply gas to the airbag 14. This deploys and inflates the airbag 14 in front of the driver's seat 70. Also, as shown in FIG. 3, the outer tether 22 is pulled toward the front side of the vehicle by the actuator 38, so that the first end 24 of the outer tether 22, which has been hidden in the airbag 14, is extracted. This extracts the pocket portion 20. Since pulling the outer tether 22 pulls the inner tether 30 together with the outer tether 22 in the extracting direction of the pocket portion 20, the part of the airbag body 16 to which the second end 34 of the inner tether 30 is joined is pulled in the extracting direction.

Figure 4:
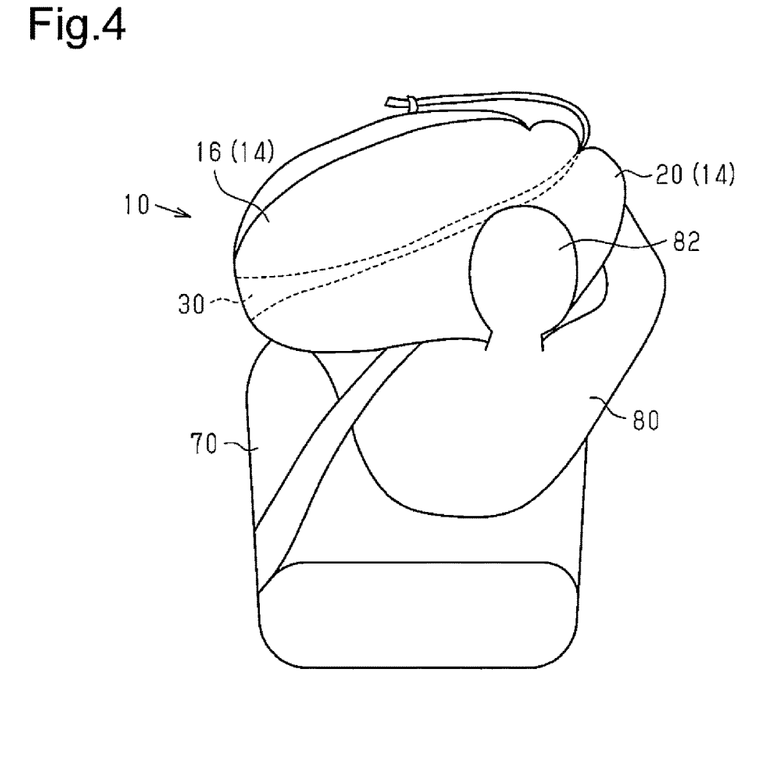
FIG. 4 is an explanatory perspective view showing operation of a driver's seat airbag apparatus.

Thus, as shown in FIG. 4, the gas is smoothly supplied into the pocket portion 20 allowing the pocket portion 20 to be inflated at an early stage to receive the head 82 of an occupant 80, who is falling obliquely forward. The upper body of the occupant 80 is received by the airbag body 16.

In contrast, when the controller 90 detects a head-on collision of the vehicle based on a detection signal from the sensor 92, the actuator 38 is not activated. Thus, the outer tether 22 does not extract the pocket portion 20. The inner tether 30 holds the pocket portion 20 hidden inside the airbag body 16. Thus, the airbag 14 is deployed and inflated in the same manner as an airbag that does not have the pocket portion 20 or the outer tether 22.

The vehicle airbag apparatus according to the above described embodiment has the following advantages.

(1) The driver's seat airbag apparatus 10 includes the airbag 14, the outer tether 22, the inflator 36, and the actuator 38. The airbag 14 includes the airbag body 16 and the pocket portion 20, which is provided on a side of the airbag body 16. The outer tether 22 is located outside the airbag 14 and is joined to the pocket portion 20. The inflator 36 supplies gas to the airbag 14. When an oblique collision of the vehicle is detected, the actuator 38 pulls the outer tether 22 to extract the pocket portion 20.

This configuration operates in the above described manner so that, at an oblique collision of the vehicle, the head 82 of the occupant 80, who is falling obliquely forward, is received.

(2) The driver's seat airbag apparatus 10 includes the inner tether 30. The inner tether 30 is located inside the airbag 14 and includes the first end 32, which is connected to the outer tether 22, and the second end 34, which is joined to the airbag body 16 at a location that is on the opposite side of the airbag body 16 from the pocket portion 20.

This configuration operates in the above described manner so that the pocket portion 20 receives the head 82 of the occupant 80, who is falling obliquely forward, and that the airbag body 16 receives the upper body of the occupant 80. Further, pulling the inner tether 30 together with the outer tether 22 in the extracting direction of the pocket portion 20 pulls the entire airbag 14 in the extracting direction of the pocket portion 20. Thus, the occupant 80, who is falling obliquely forward, is received in a large area of the airbag 14.

(3) Since the actuator 38 is of an explosive type, the actuator 38 is activated shortly after the detection of an oblique vehicle collision, so that the outer tether 22 starts being pulled. This allows the pocket portion 20 to be inflated at an early stage.

Second Embodiment

Figure 5A:
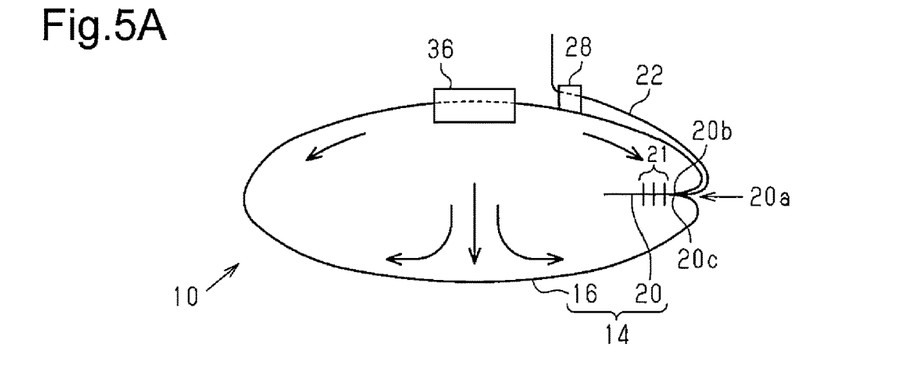
FIG. 5A is a cross-sectional view showing an airbag according to a second embodiment when being deployed and inflated.
Figure 5B:
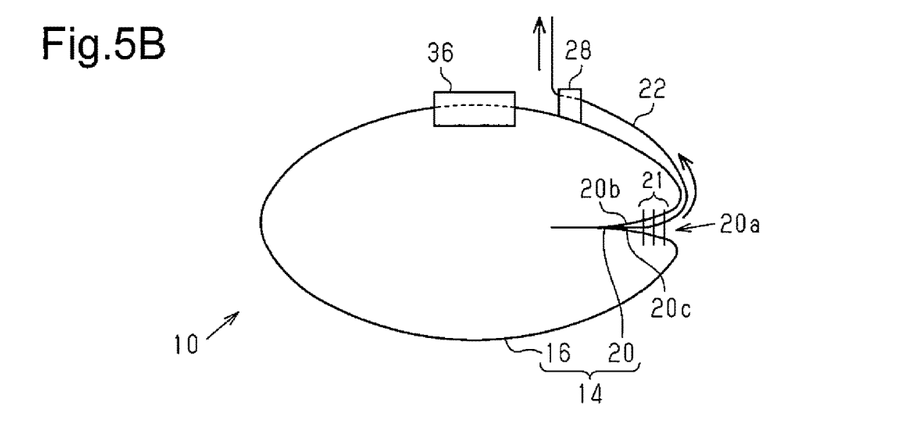
FIG. 5B is a cross-sectional view showing the airbag according to the second embodiment immediately before the sewn portion is broken.
Figure 6:
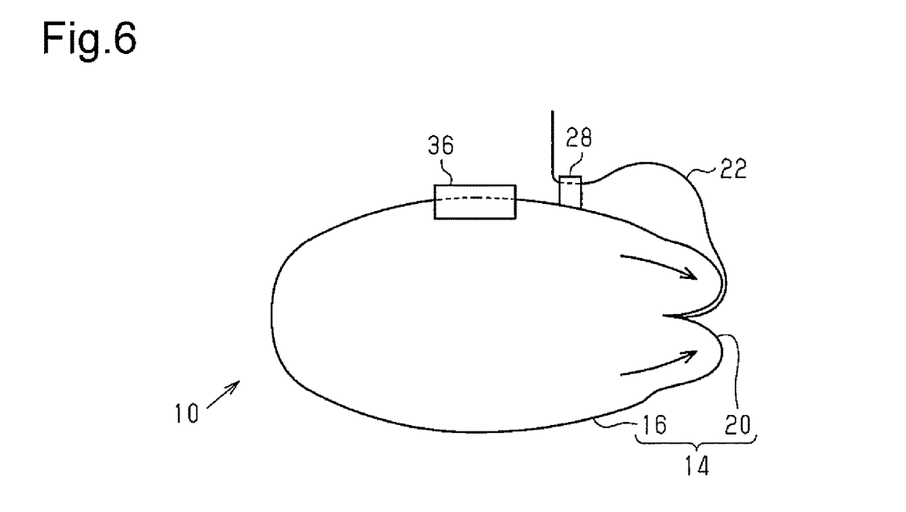
FIG. 6 is a cross-sectional view illustrating an airbag of a comparison example when being deployed and inflated.

With reference to FIGS. 5A, 5B and 6, a driver's seat airbag apparatus 10 according to a second embodiment will be described. Differences from the first embodiment will be mainly discussed. The same reference numerals are given to those components in the second embodiment that are the same as the corresponding components of the first embodiment, and redundant explanations are omitted. In FIGS. 5A, 5B, and 6, the inner tether is not illustrated.

As shown in FIG. 6, depending on the size and shape of the pocket portion 20, the pocket portion 20 may be pushed out of the airbag body 16 by the pressure of gas supplied from the inflator 36 even if the outer tether 22 is not pulled by the actuator 38. In this case, the flow of gas into the pocket portion 20 may delay the deployment and inflation of the airbag body 16.

Thus, in the present embodiment, as shown in FIGS. 5A and 5B, two sections 20*b*, 20*c* of the pocket portion 20 that face each other are sewn to each other by a sewn portion 21 to close an opening 20a of the pocket portion 20. The strength of the threads in the sewn portion 21 is determined such that the sewn portion 21 is broken when pulled by the outer tether 22 and the opening 20a is opened. The sewn portion 21 functions as a joint portion of the present invention.

The vehicle airbag apparatus according to the above-mentioned second embodiment has the following advantage in addition to the advantages (1) to (3) of the first embodiment.

(4) The pocket portion 20 includes the two sections 20b, 20c, which face each other. The pocket portion 20 has the sewn portion 21, at which the two sections 20b, 20c are sewn to each other to close the opening 20a of the pocket portion 20. When pulled by the outer tether 22, the sewn portion 21 is broken to open the opening 20a.

With this configuration, the opening 20a of the pocket portion 20 is closed by the sewn portion 21 in the pocket portion 20. Thus, when the outer tether 22 is not pulled by the actuator 38, the pocket portion 20 is prevented from being pushed out by the pressure of gas. Therefore, when a collision other than an oblique vehicle collision occurs, the pocket portion 20 is restrained from inflating, so that the airbag body 16 is properly deployed and inflated.

Also, when the actuator 38 pulls the outer tether 22, the sewn portion 21 is broken and the pocket portion 20 is extracted. Therefore, at an oblique vehicle collision, the airbag body 16 and the pocket portion 20 are both properly deployed and inflated.

Third Embodiment

Hereinafter, with reference to FIGS. 1 and 7, a front passenger seat airbag apparatus 40 according to a third embodiment will be described. Differences from the first embodiment will be mainly discussed. The same reference numerals are given to those components in the third embodiment that are the same as those of the first embodiment. Components of the third embodiment that are equivalent to those in the first embodiment are given reference numerals 4* to 6*, which are obtained by adding 30 to the reference numerals 1* to 3* in the first embodiment, and redundant explanations are omitted. The sign * represents one of 0 to 9.

A base portion 42 is provided on the back of a section of the instrument panel 74 that is located in front of the front passenger seat 72.

Figure 7:
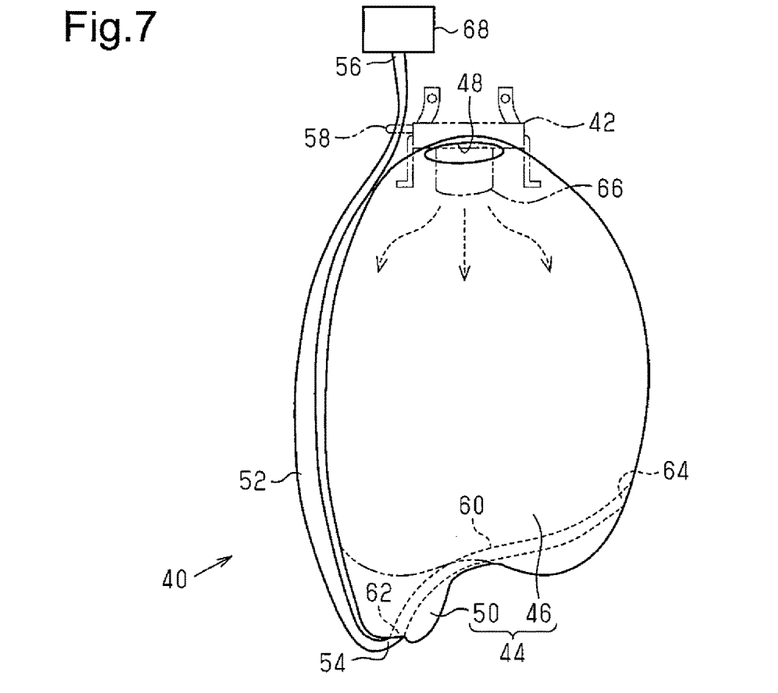
FIG. 7 is a plan view illustrating a front passenger seat airbag according to a third embodiment when completely deployed and inflated.

As shown in FIG. 7, the airbag 44 of the third embodiment has a pocket portion 50 provided on the inner side of the opposite sides in the vehicle width direction of an airbag body 46. That is, the pocket portion 50 is provided on the side corresponding to the driver's seat 70 and is configured to project further rearward than the airbag body 16.

The outer tether 52 has a first end 54, which is joined to the distal end of the pocket portion 50 (the left lower end as viewed in FIG. 7), and a second end 56, which is joined to an actuator 68. The actuator 68 is provided on the back side of the instrument panel 74. When the airbag 44 is completely deployed and inflated, the outer tether 52 is located on the side of the airbag body 46 that faces the driver's seat 70 and guided by an outer guide 58 on the base portion 42 to extend toward the actuator 68.

Operation of the third embodiment will now be described.

When the controller 90 detects an oblique vehicle collision based on a detection signal from the sensor 92, an inflator 66 is activated to supply gas to the airbag 44, so that the airbag 44 is deployed and inflated in front of the front passenger seat 72 as shown in FIG. 7. Also, as in the case of the driver's seat airbag apparatus 10, the outer tether 52 of the front passenger seat airbag apparatus is pulled toward the front side of the vehicle by the actuator 68, so that the first end 54 of the outer tether 52, which has been hidden in the airbag 44, is extracted. This extracts the pocket portion 50. Pulling the outer tether 52 pulls an inner tether 60 together with the outer tether 52 in the extracting direction of the pocket portion 50. Thus, the part of the airbag body 46 to which a second end 64 of the inner tether 60 is joined is pulled in the extracting direction.

Thus, gas is smoothly supplied into the pocket portion 50, allowing the pocket portion 50 to be inflated at an early stage and receive the head of the occupant, who is falling obliquely forward. The upper body of the occupant can be received by the airbag body 46.

In contrast, when the controller 90 detects a head-on collision of the vehicle based on a detection signal from the sensor 92, the actuator 68 is not activated. Thus, the outer tether 52 does not extract the pocket portion 50. The inner tether 60 holds the pocket portion 50 hidden inside the airbag body 46. Thus, as indicated by long dashed double-short dashed lines in FIG. 7, the airbag 44 is deployed and inflated in the same manner as an airbag that does not have the pocket portion 50 or the outer tether 52.

The airbag apparatus according to the above described third embodiment achieves advantages that are equivalent to the advantages (1) to (3) of the first embodiment.

Modifications

The above described embodiments may be modified as follows.

Figure 8:
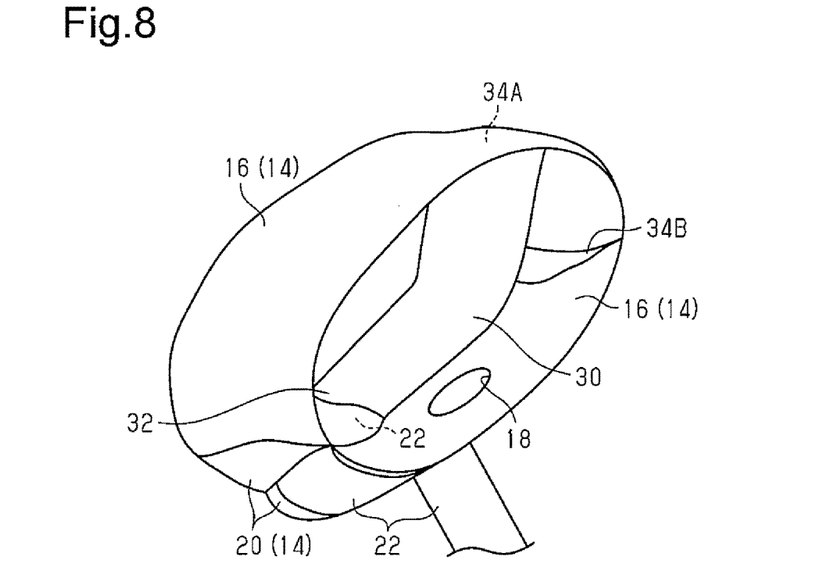
FIG. 8 is a cross-sectional view illustrating an airbag according to a first modification when being deployed and inflated.

FIG. 8 shows a first modification, in which an inner tether 30 of the driver's seat airbag apparatus 10 is branched to have a plurality of second ends 34A, 34B, which is joined to the airbag body 16. In this case, pulling the inner tether 30 in the extracting direction of the pocket portion 20 pulls the parts of the airbag body 16 to which the second ends 34A, 34B are joined in the extracting direction of the pocket portion 20. This reduces the volume of the part of the airbag body 16 about the parts to which the second ends 34A, 34B are joined and thus promotes the movement of gas toward the pocket portion 20. Thus, the pocket portion 20 is inflated at an early stage to properly receive the head of the occupant.

Figure 9:
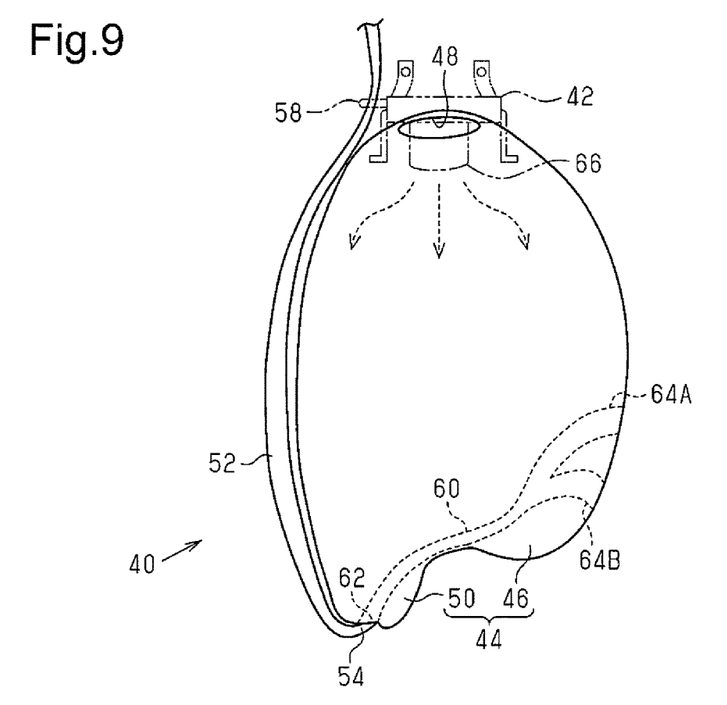
FIG. 9 is a plan view illustrating an airbag according to a second modification when completely deployed and inflated.

FIG. 9 shows a second modification, in which an inner tether 60 of the front passenger seat airbag apparatus 40 is branched to have a plurality of second ends 64A, 64B, which is joined to the airbag body 46.

Figure 10:
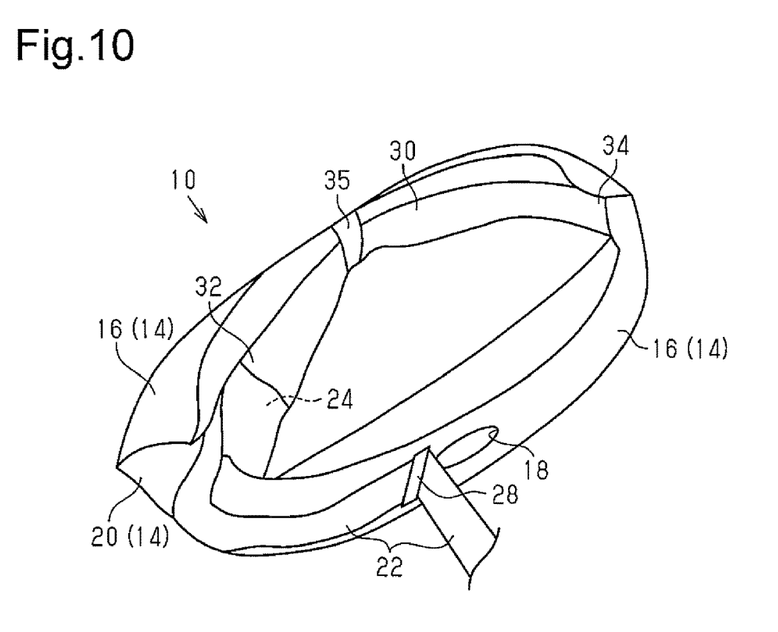
FIG. 10 is a cross-sectional view illustrating an airbag according to a third modification when being deployed and inflated.
Figure 11:
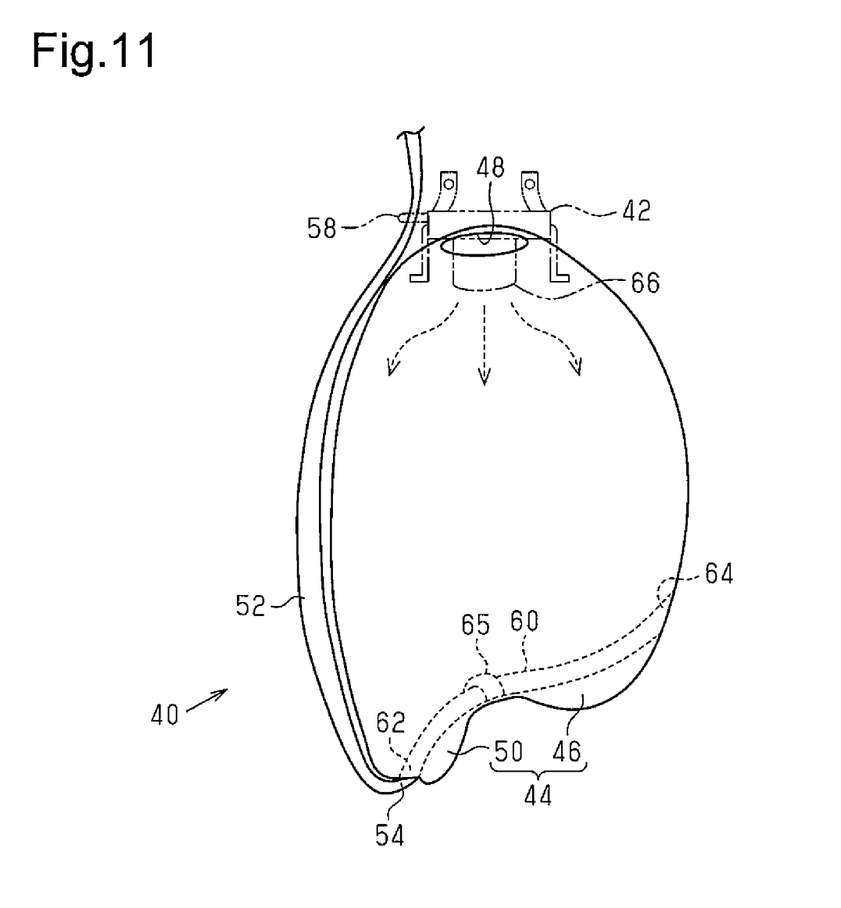
FIG. 11 is a plan view illustrating an airbag according to a fourth modification when completely deployed and inflated.

FIG. 10 shows a third modification, in which the driver's seat airbag apparatus 10 includes an inner guide 35 on the inner surface of the airbag body 16. When the inner tether 30 is pulled in the extracting direction of the pocket portion 20, the inner guide 35 guides displacement of the inner tether 30. In this case, pulling the inner tether 30 in the extracting direction of the pocket portion 20 pulls the inner guide 35 via the inner tether 30. This reduces the volume of the part of the airbag body 16 about the inner guide 35, which promotes movement of gas toward the pocket portion 20. Thus, the pocket portion 20 is inflated at an early stage to properly receive the head of the occupant. FIG. 11 shows a fourth modification, in which the front passenger seat airbag apparatus 40 includes an inner guide 65 on the inner surface of the airbag body 46. When the inner tether 60 is pulled in the extracting direction of the pocket portion 50, the inner guide 65 guides displacement of the inner tether 60.

Figure 12A:
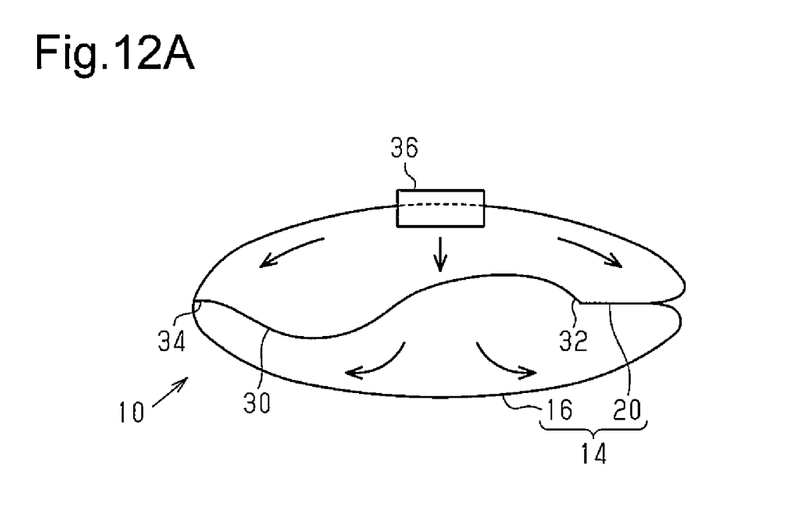
FIG. 12A is a cross-sectional view showing an airbag according to a fifth modification when being deployed and inflated.
Figure 12B:
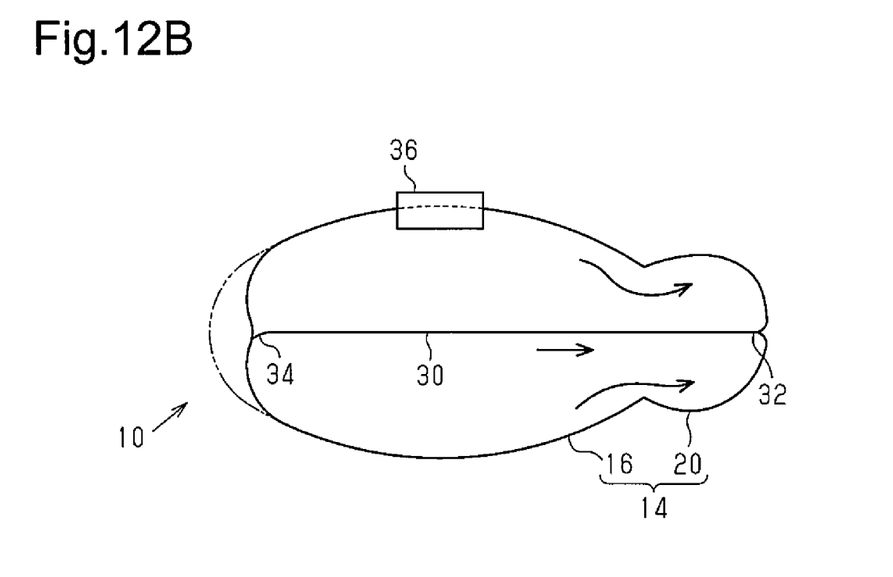
FIG. 12B is a cross-sectional view showing the airbag according to the fifth modification when completely deployed and inflated.

FIG. 12A shows a fifth modification, in which the outer tether is omitted. In this case, when the inflator 36 is activated and supplies gas to the airbag 14, the pressure of the gas supplied from the inflator 36 deploys and inflates the airbag 14 and pushes the pocket portion 20 out of the airbag body 16 as shown in FIG. 12B. The inflation of the pocket portion 20 by the inflow of gas pulls the inner tether 30 in the bulging direction of the pocket portion 20 (rightward as viewed in FIG. 12B). Thus, the part of the airbag body 16 to which the second end 34 of the inner tether 30 is joined is pulled in the bulging direction. Therefore, at an oblique vehicle collision, the head of the occupant, who is falling obliquely forward, is received.

In the first embodiment, the first modification, and the third modification, the inner tether 30 may be omitted. In the third embodiment, the second modification, and the fourth modification, the inner tether 60 may be omitted.

The invention claimed is:

1. A vehicle airbag apparatus comprising:
an airbag, which is configured to be supplied with gas to be deployed and inflated in front of one of a driver's seat and a front passenger seat of a vehicle, wherein the airbag includes an airbag body and a pocket portion provided on a side of the airbag body;
an outer tether, which is located outside the airbag and joined to the pocket portion;
an inflator, which supplies gas to the airbag; and
an actuator, wherein, when a movement of the vehicle in an oblique direction due to a collision is detected, the actuator pulls the outer tether to extract the pocket portion.

2. The vehicle airbag apparatus according to claim 1, further comprising an inner tether, which is located inside the airbag and includes a first end joined to the pocket portion and a second end joined to the airbag body at a location that is on an opposite side of the airbag body from the pocket portion.

3. The vehicle airbag apparatus according to claim 2, wherein
the second end of the inner tether is one of a plurality of second ends respectively joined to the airbag body, and
the inner tether is branched to have the second ends.

4. The vehicle airbag apparatus according to claim 2, wherein the airbag body includes
an inner surface, and
a guide provided on the inner surface, wherein, when the inner tether is pulled in an extracting direction of the pocket portion, the guide guides displacement of the inner tether.

5. The vehicle airbag apparatus according to claim 1, wherein the airbag body includes
an outer surface, and
a guide provided on the outer surface, wherein, when the outer tether is pulled in an extracting direction of the pocket portion, the guide guides displacement of the outer tether.

6. The vehicle airbag apparatus according to claim 1, wherein
the pocket portion includes two sections that face each other,
the pocket portion includes a joint portion,
the joint portion joins the two sections to each other and closes an opening of the pocket portion, and
when pulled by the outer tether, the joint portion is broken and opens the opening.

* * * * *